United States Patent [19]
Brugger et al.

[11] Patent Number: 5,664,931
[45] Date of Patent: Sep. 9, 1997

[54] EDGE LIFTING END EFFECTOR

[75] Inventors: Jerome M. Brugger, Melbourne; Joseph Daniel Greenwell, Florence, both of Ky.

[73] Assignee: R. A. Jones & Co., Inc., Covington, Ky.

[21] Appl. No.: 510,585

[22] Filed: Aug. 2, 1995

[51] Int. Cl.$^6$ ................................................. B65G 1/04
[52] U.S. Cl. ...................... 414/416; 294/81.61; 294/86.4; 294/106; 414/786
[58] Field of Search ........................ 414/416, 786, 414/798.9, 729; 294/86.4, 81.61, 81.2, 104, 106; 901/15, 31, 38

[56] References Cited

U.S. PATENT DOCUMENTS

| | | | |
|---|---|---|---|
| 1,807,360 | 5/1931 | Wehr | 294/106 |
| 1,822,629 | 9/1931 | McIlvried | 294/106 |
| 3,302,802 | 2/1967 | Müller | 294/104 |
| 3,322,455 | 5/1967 | Gressbach | 294/104 |
| 3,618,800 | 11/1971 | Collins et al. | 294/86.4 X |
| 4,621,852 | 11/1986 | Maki | 294/86.4 |
| 4,676,542 | 6/1987 | Besold | 294/86.4 X |
| 4,830,565 | 5/1989 | Bucher et al. | 414/416 |
| 4,968,081 | 11/1990 | Beight et al. | 294/104 |
| 5,066,189 | 11/1991 | Shelll | 414/416 |
| 5,083,352 | 1/1992 | Nakako | 294/86.4 X |
| 5,161,847 | 11/1992 | Yakou | 294/86.4 X |
| 5,199,845 | 4/1993 | Hirashima et al. | 294/86.4 X |
| 5,346,351 | 9/1994 | Priolo et al. | 294/104 X |
| 5,427,222 | 6/1995 | Miura et al. | 414/416 X |

FOREIGN PATENT DOCUMENTS

| | | | |
|---|---|---|---|
| 0045174 | 2/1982 | European Pat. Off. | 294/86.4 |
| 0154227 | 9/1985 | European Pat. Off. | 294/86.4 |
| 703467 | 12/1979 | U.S.S.R. | 294/81.61 |
| 1426926 | 9/1988 | U.S.S.R. | 294/86.4 |
| 1592268 | 9/1990 | U.S.S.R. | 294/81.61 |

*Primary Examiner*—David A. Bucci
*Attorney, Agent, or Firm*—Wood, Herron & Evans, L.L.P.

[57] ABSTRACT

An end effector for a robot for material handling of a stack of carton blanks or other items is disclosed. The end effector includes a pair of movable abutment members which engage opposing side edges of the blanks to thereby lift, transfer or manipulate the carton blanks for transfer to another material handling operation or station. Even though the individual blanks may be flexible, the end effector according to this invention grasps the stack of blanks on opposing side edges thereof to lift the stack of blanks without the need for inverting or otherwise repositioning the stack as required by prior art end effectors. A tab or other feature on the blanks may be utilized by the abutment members when engaging the blanks in order to assist the lifting of the stack.

28 Claims, 4 Drawing Sheets

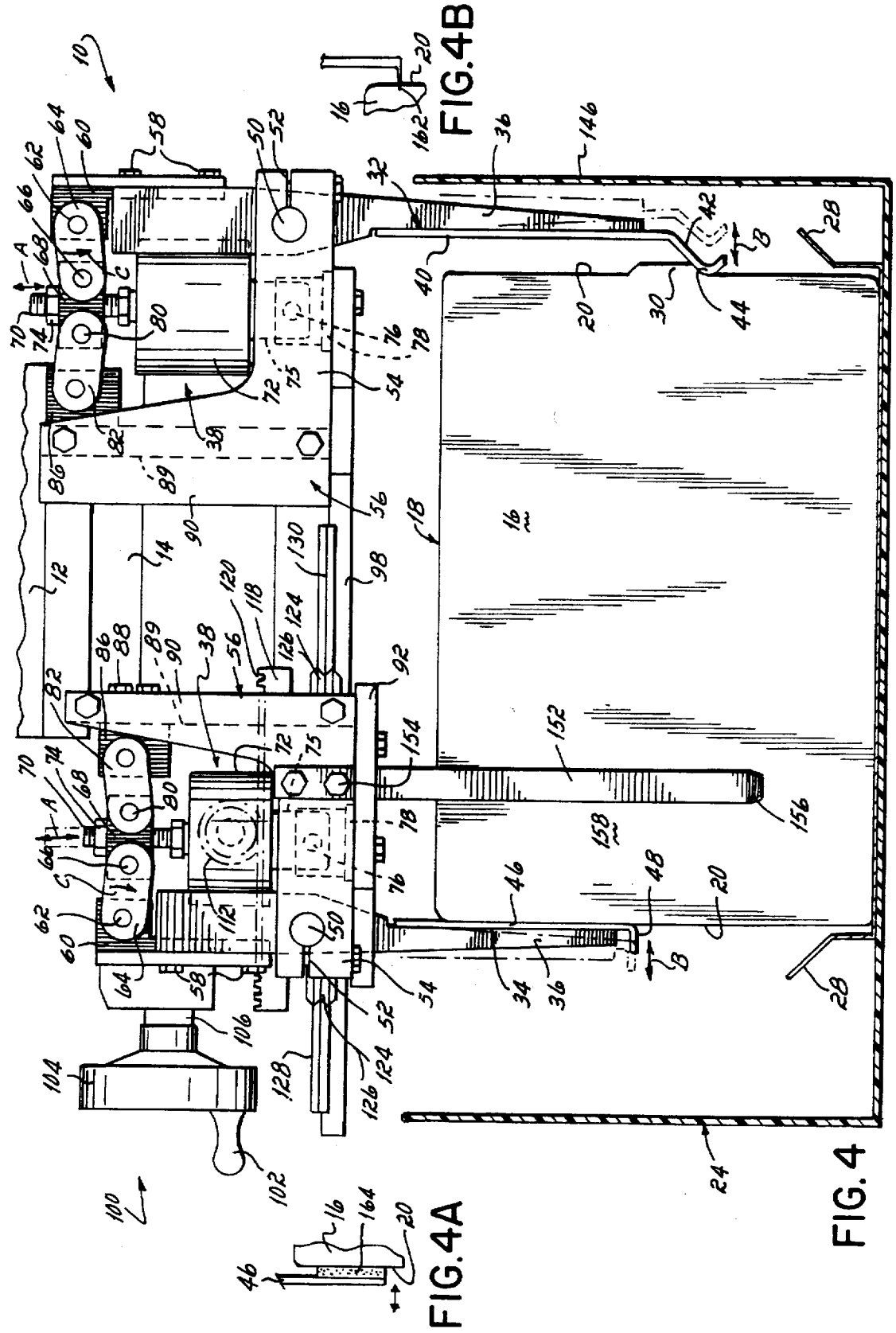

EDGE LIFTING END EFFECTOR

BACKGROUND OF THE INVENTION

The present invention is related to an end effector mounted on a robot for handling particular items, particularly a stack of flattened un-erected carton blanks.

An end effector is a device connected to a robot or other automated mechanical device for the handling of particular items during large volume or mass production operations. In one particular situation, an end effector is used in handling a stack or log of flat, un-erected carton blanks. Each carton blank is generally planar and may be constructed of paper board or the like. Examples of the uses for such cartons are as a cereal box or numerous other packages for food items.

The flattened carton blanks may be flexible in response to a compressive force applied to opposing side edges of the blank. The log or stack includes a plurality of similarly oriented blanks with the side edges of the blanks aligned and the planar faces of the blanks juxtaposed to, i.e., facing, one another. The stack or log of carton blanks may be contained in a cardboard box or tote which is used to transfer the blanks from a first location where they are manufactured to a second location where they may be individually erected and filled for shipment. Accordingly, the blanks as they exist in the tote or box may be glued but are in their flattened or non-erected state. The blanks must be removed from the tote and transferred to another machine for further processing, such as a carton magazine, conveyor, feeder, rack or the like. Typically, a robot having an end effector for handling, lifting or manipulating this stack of blanks is used for this transfer.

In order to remove the stack of blanks from the tote or box it is generally known to capture the stack of cartons with an end effector and then invert the stack so that the tote or box is on top thereof and can be lifted from the blanks. Prior to inverting the blank filled tote, swingable gates or doors are disposed over the top of the stack of cartons so that when the stack is inverted the swingable gates or doors support what is now the bottom of the stack of blanks to keep them from falling. The gates or doors then are operated as "bombay" type doors which open to deposit the stack at the next station for further processing.

However, the process of capturing the stack of blanks with the end effector as described and then inverting the stack in order to remove them from the tote or box has proven to be complicated and troublesome. Specifically, the involved operations of inverting the stack in order to remove the tote and supporting the inverted stack with gates positioned on the bottom thereof require a very sophisticated and costly end effector to carry out this complicated carton handling procedure. As a result, the end effector is costly to acquire and may be prone to failure after prolonged use presenting maintenance problems involving extensive downtime at the production facility.

In another known system for removing the stack of blanks from the tote, faces of the two outer most blanks are squeezed between opposing clamps. Only the outermost blanks are contacted by the clamps so the clamps must exert a very large compressive force on the stack in order to lift all of the blanks. One problem associated with this type of system is the large force which must be generated between the clamps to lift the stack. Such a large force may damage or mutilate at least the outermost blanks if not others in the stack. Another limitation of such a system is that even with large compressive forces, the number of blanks in the stack which can be handled is limited. Since only the faces of the outermost blanks are contacted by the clamps, the compressive force generated by the clamps in combination with the frictional interaction between adjacent blanks on the interior of the stack is required to lift the entire stack. If the stack is too large then the interior blanks will begin to fall from the stack during lifting and the remaining blanks will follow. As a result, this known system is limited in the number of blanks which can be lifted in a single operation.

Therefore, it has been an objective of this invention to provide an improved end effector for handling a stack of flattened un-erected and individually flexible cartons.

It has been a further objective of the invention to provide such an end effector which does not require inverting the carton-filled tote in order to remove the blanks therefrom for transfer to a subsequent station.

It has been a further objective of this invention to provide such an end effector which is capable of handling a high volume of operations in a timely manner without the high maintenance and complicated operations required of known end effectors.

SUMMARY OF THE INVENTION

The present invention achieves these stated and other objectives with an end effector which is capable of transferring a large volume of logs or stacks of individually flexible carton blanks from trays, totes or the like to a subsequent station such as a carton magazine, conveyor, or feeder. Further, the end effector of this invention may also be used to remove the carton blanks from a gluing or other station and place them into a tray or tote.

The end effector of this invention is based upon the idea of utilizing a carton support which engages a stack of carton blanks at two opposite edges thereof in order to lift, transfer or manipulate the cartons. As previously described, the cartons may be individually flexible in response to compressive forces on opposed side edges. With a number of similarly oriented cartons of this type assembled into a stack or log, one might expect that the stack or log will be flexible, and bow or deflect in response to devices or abutment members which contact opposing edges of the blanks. However, according to presently preferred embodiments of this invention, the stacks of flexible blanks are lifted from the tote by abutment members which contact opposing edges of the blanks. Once the abutment members of the end effector of this invention engage the opposing edges of the blanks, the robot lifts the end effector and abutment members with the blanks therebetween from the tote and transfers the blanks to a subsequent station without inverting the stack or utilizing the swingable gates or "bombay" type doors currently known in the art. The blanks are thus engaged at their edges and are lifted at their edges. Surprisingly, they do not fall from the edge abutment members.

In one presently preferred embodiment, each carton blank is provided with a tab on one edge thereof which is used in the erected carton to help re-close the carton during intermittent uses. One abutment member of the end effector according to this invention contacts the stack of blanks beneath the lower edge of this tab and another abutment member contacts the opposite edge of the carton blank. It will be appreciated that the weight of the blanks will tend to be exerted in a downward direction and it would be expected that the blanks would tilt when lifted with the tab as described; however, the downward movement of the blanks is obstructed by the abutment member positioned below the tabs of the blanks. Accordingly, the weight of the blanks themselves would ordinarily tend to rotate the blanks about the first abutment member positioned below the tabs, but this rotation is prevented by the opposite abutment member positioned on the other edge of the blanks and above the level of the first abutment member. Thus, the two abutment members cooperate to hold the stack of blanks or opposing edges and to lift them from the tote and transfer them to another station.

It will be appreciated that each of the blanks individually may be flexible and have a certain bendable nature and that if the blank is bowed then the opposing side edges of the blank are spaced a shorter distance apart than that which is used for the abutment members to engage and lift the side edges of the blanks. However, when there are a plurality of blanks to be lifted in a stacked configuration, it will be appreciated that while each one of the blanks may be flexible, the total number of blanks operate together to maintain a more rigid relatively inflexible stack between the abutment members.

Another feature of the end effector of this invention is retaining arms which can be positioned on the faces of the stack adjacent the edges to inhibit the blanks from bending or deflecting from between the abutment members. Accordingly, each of the blanks maintains a relatively planar configuration while being held between abutment members of the end effector, either by virtue of the blanks' cooperation with other blanks in the stack, the engagement of a retainer on the faces of the end blanks of the stack, or the fact that the blanks inherent stiffness or rigidity is of a sufficient degree to resist any bowing of the blank when engaged between the abutment members of the end effector. Other features of the end effector of this invention include specific abutment members or devices such as a knife edge, a friction pad, a generally planar blocking plate, or a flange which may be used to hook underneath the tab on the blanks to engage and lift the side edges of the blanks.

As a result of the end effector according to this invention, a stack of blanks may be easily lifted from a tote and transferred to another station without the need for inverting the tote filled with carton blanks or other complicated procedures required of known end effectors.

BRIEF DESCRIPTION OF THE DRAWINGS

These and other objectives and features of the invention will become more readily apparent from the following detailed description taken in conjunction with the accompanying drawings in which:

FIG. 3 is a partial cross sectional view taken along line 3—3 of FIG. 1;

FIG. 4 is a cross sectional side elevational view taken along line 4—4 of FIG. 1 showing the abutment members engaging opposing side edges of a stack of blanks;

FIGS. 4A and 4B are views of alternative abutment members according to presently preferred embodiments of this invention.

DETAILED DESCRIPTION OF THE INVENTION

Figure 1:
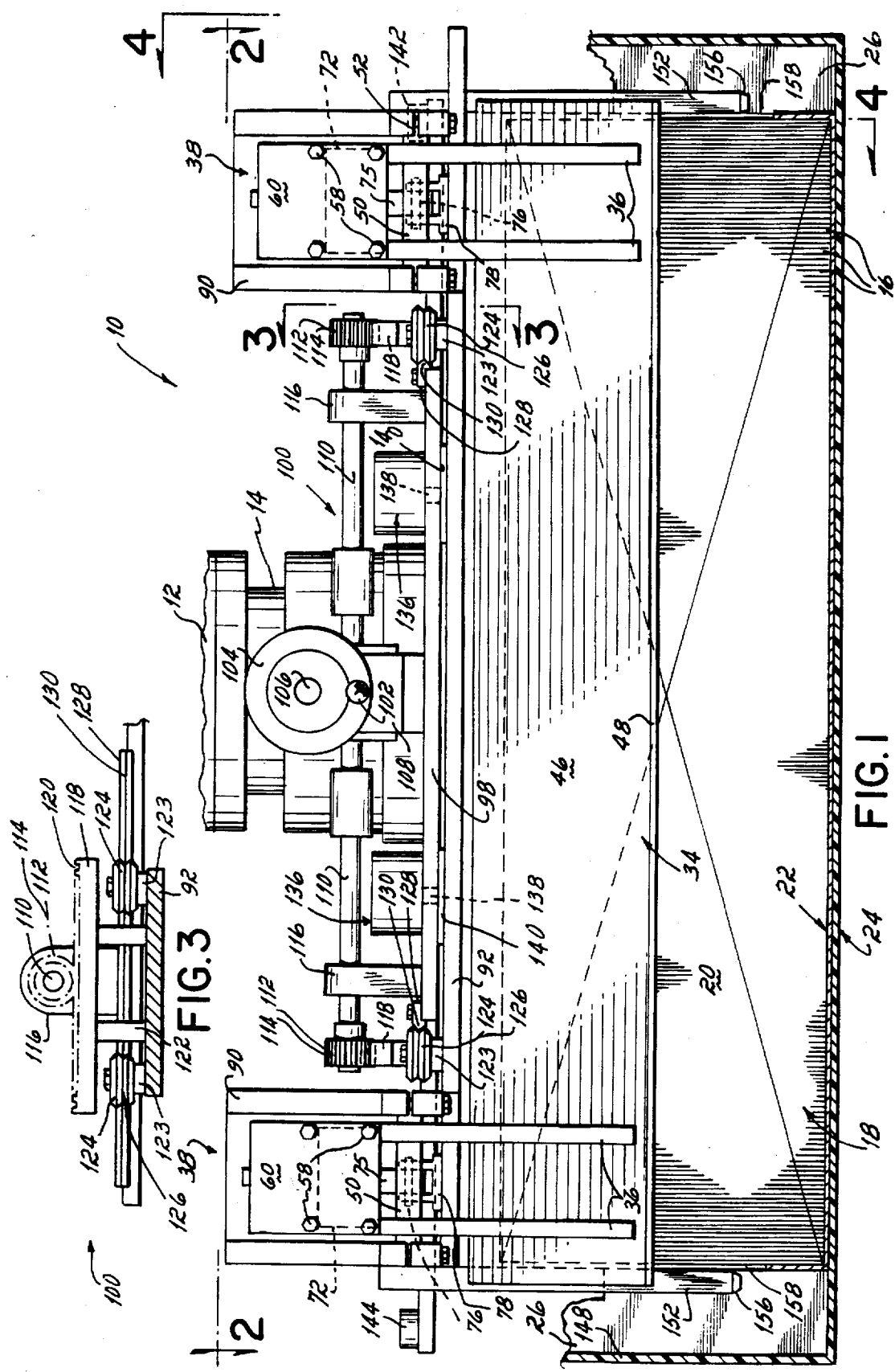
FIG. 1 is a front elevational view of a presently preferred embodiment of an end effector according to this invention.

The components and operation of an end effector according to presently preferred embodiments of the invention will now be described with reference to the accompanying drawings. Referring to FIG. 1, an end effector 10 of a presently preferred embodiment is shown attached to a robot 12 as is well known by those skilled in the art. The end effector 10 is secured to the robot 12 by a mount 14. The end effector 10 is positioned over a number of individual carton blanks 16 which are assembled into a stack or log 18. Each blank 16 is generally planar and is a flattened but un-erected carton. The blank 16 may be glued or unglued or be in any of a number of configurations according to this invention. The stack 18 consists of a number of similarly oriented blanks 16 in which each blank 16 is in face-to-face juxtaposition with an adjacent blank with opposing side edges 20 of each blank 16 aligned in a similar orientation. The stack 18 is contained in a tray 22 which is contained within a tote 24 as shown in FIG. 1. A spacing member 26 is positioned between the tray 22 and the tote 24 to establish a gap of preferably about one inch. An upper edge of the tote 24 may extend above the upper surface of the stack 18. The upper edge of the tray 22 includes an outwardly flared flange 28 and the upper edge extends upwardly only to the lower portion of the stack preferably below the midway point of the stack (FIG. 4). The stack 18 of blanks 16 is snugly positioned within the tray 22 prior to the end effector 10 engaging the stack 18. The tray 22, spacer 26 and tote 24 may be molded or otherwise formed or secured together as a single component to fix the position of the stack 18.

Figure 5:
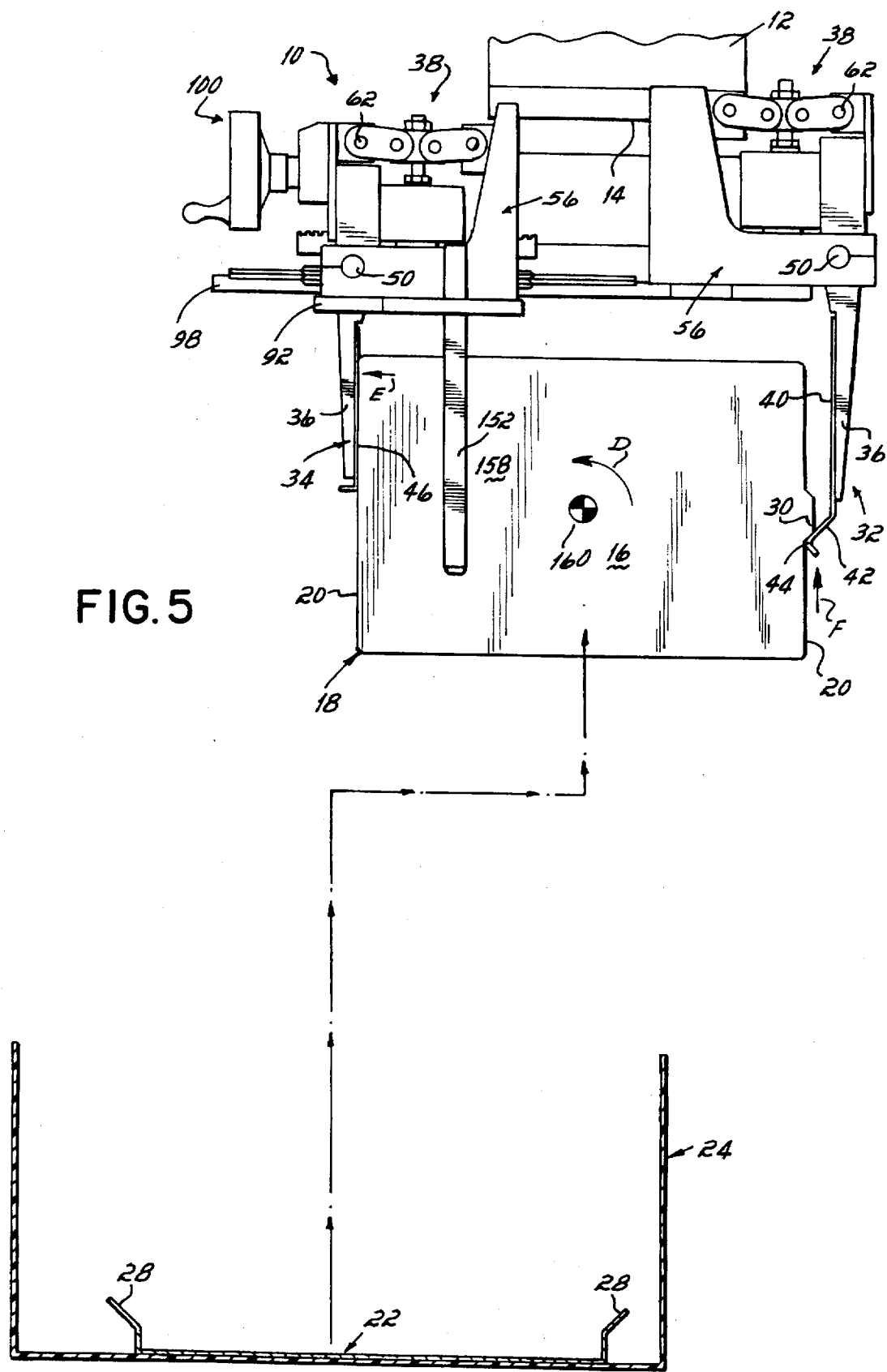
FIG. 5 is a view similar to FIG. 4 showing the blanks being lifted from the tote by the end effector of this invention.

As shown particularly in FIGS. 4 and 5, each blank 16 may include a re-close tab 30 which will be used in the erected carton to help re-close the carton during intermittent uses. The re-close tab 30 on the blank 16 projects from one edge 20 of blank 16 on the stack 18 in one embodiment. A complementary notch (not shown) may be provided on the opposite edge of the blank 16 depending upon the manufacturing or stamping process used for the blank 16.

As further shown in FIG. 4, a first abutment member 32 and a second abutment member 34 are each connected to two pair of arms 36 which extend down from actuator assemblies 38 of the end effector 10. In one embodiment, the first abutment member 32 consists of a generally planar plate 40 with a flange 42 on the lower edge thereof. The flange 42 includes an inwardly directed detent 44 which can be positioned immediately below the tab 30 on each of the blanks 16 as shown in FIGS. 4 and 5 when the abutment member 32 engages the stack 18 in a closed position of the end effector 10. An open position of the end effector 10 is shown in phantom lines in FIG. 4. On the opposite side of the stack 18 the second abutment member 34 is movable to engage the opposite edges 20 of the blanks 16. In this embodiment, the second abutment member 34 includes a generally planar plate 46 with an outwardly turned lip 48 on a bottom edge thereof. In the embodiment shown in FIG. 4, the first abutment member 32 having the flange 42 contacts the blanks 16 immediately below the tab 30 whereas the majority of the face of the opposing abutment plate 46 contacts the upper portion of the stack 18 on the opposite edge of the blanks 16. As a result, the first abutment member 32 can be referred to as a lifting abutment member and the second abutment member 34 as a blocking abutment member.

Each of the abutment members 32, 34 are connected to two pairs of arms 36 in which each pair of arms 36 is located proximate each end of the abutment member 32 or 34 as shown in FIG. 1. Each pair of arms 36 is mounted on a shaft 50 for pivotal movement about the shaft 50. Each shaft 50 is seated in a keyhole slot 52 in a lower leg 54 of a pair of generally L-shaped actuator plates 56. An upper end of each arm 36 is connected as by bolts 58 or other fasteners to a flag-shaped bracket 60. The bracket 60 in turn is pivotally coupled by a pin 62 to one end of a link 64. The opposite end of the link 64 is pivotally coupled by a pin 66 to a collar 68 surrounding a stud shaft 70 which projects axially from an actuating cylinder 72 of the end effector 10. The collar 68 is secured to the upper end of the stud 70 by a nut 74 or the like. The lower end of cylinder 72 has a support 75 pivotally mounted on a shaft 76 to a clevis bracket 78. The stud 70 projects upwardly from the actuating cylinder 72 in a generally vertical orientation and is moveable generally vertically as shown by Arrows A in FIG. 4. The collar 68 on each stud 70 is also pivotally coupled as with a pin 80 or the like to one end of a second link 82. The opposite end of the second link 82 is pivotally coupled with a pin 84 to a block 86 which is fixed as by bolts 88 or other fasteners to a plate 89 sandwiched between upper legs 90 of the L-shaped actuator plates 56 on opposite sides of the actuating cylinder 72. Each abutment member 32, 34 is connected in a presently preferred embodiment to two pair of arms 36 and each pair of arms 36 is coupled to a separate flag shaped bracket 60 and actuator assembly 38 as described. Therefore, each abutment member 32, 34 is connected to two actuator assemblies 38.

The actuator assemblies 38 connected to the first or lifting abutment member 32 are fixed relative to the end effector 10; whereas, the actuator assemblies 38 associated with the second or blocking abutment member 34 are mounted to a moveable lower plate 92 which can translate in the directions shown by Arrows B of FIG. 4 toward and away from the fixed actuator assemblies 38. The capability of the blocking abutment member 34 and associated actuator assemblies 38 enables the end effector 10 according to presently preferred embodiments of this invention to accommodate various sizes of blanks 16 and stacks 18 formed from those blanks 16. For example, carton blanks 16 of the following dimensions can be accommodated in one embodiment of the end effector 10 according to this invention (the width indicated is the distance between opposing edges of the blank which are contacted by the closed abutment members):

| Width | Height | Caliper Thickness | Total Blank Thickness |
|---|---|---|---|
| 6.625" | 2.00" | 0.014" | 0.042" |
| 12.625" | 8.5" | 0.022" | 0.066" |
| 15.375" | 10.00" | 0.022" | 0.066" |
| 21.625" | 15.75" | 0.056" | 0.168" |

It should be appreciated that the above dimensions are exemplary only and should not be considered a limitation of the invention.

The clevis bracket 78 of the actuator assemblies 38 for the blocking abutment member 34 is secured as by a bolt or the like to the moving plate 92 and the clevis bracket 78 of the fixed actuator assemblies 38 is secured as by a bolt or the like to a fixed mounting plate 98. It will be appreciated that the term "fixed" or the like and terms referring to movement are in reference to the end effector 10 in that the entire end effector is movable by the robot in and of itself.

The distance between the abutment members 32, 34 is adjustable to accommodate the various size blanks 16 by a translating mechanism 100 as shown in FIGS. 1–4, and particularly FIG. 3. The translating mechanism 1 00 shifts the moveable lower plate 92 relative to the mounting plate 98 and thereby adjusts the distance between the abutment members 32, 34. The translating mechanism 100 is manually adjustable according to the presently preferred embodiment of the invention by an operator grasping and rotating a handle 102 on a handwheel 104. The handwheel 104 is coupled to a shaft 106 which connects the handwheel 104 to a gear box 108. The gear box 108 in a presently preferred embodiment includes a counter (not shown) which is calibrated to indicate the position of the blocking abutment member 34 relative to the lifting abutment member 32. A shaft 110 extends laterally from opposite sides of the gear box 108 and includes a gear 112 having a plurality of teeth 114 and mounted on each end of the shaft 110. The shaft 110 extends through a bearing block 116 proximate each end thereof and each bearing block 116 is secured to the mounting plate 98. As is understood by one of ordinary skill in the art, the translating mechanism 100 may include various couplings and associated linkages as required or be of a different design within the scope of this invention.

Figure 2:
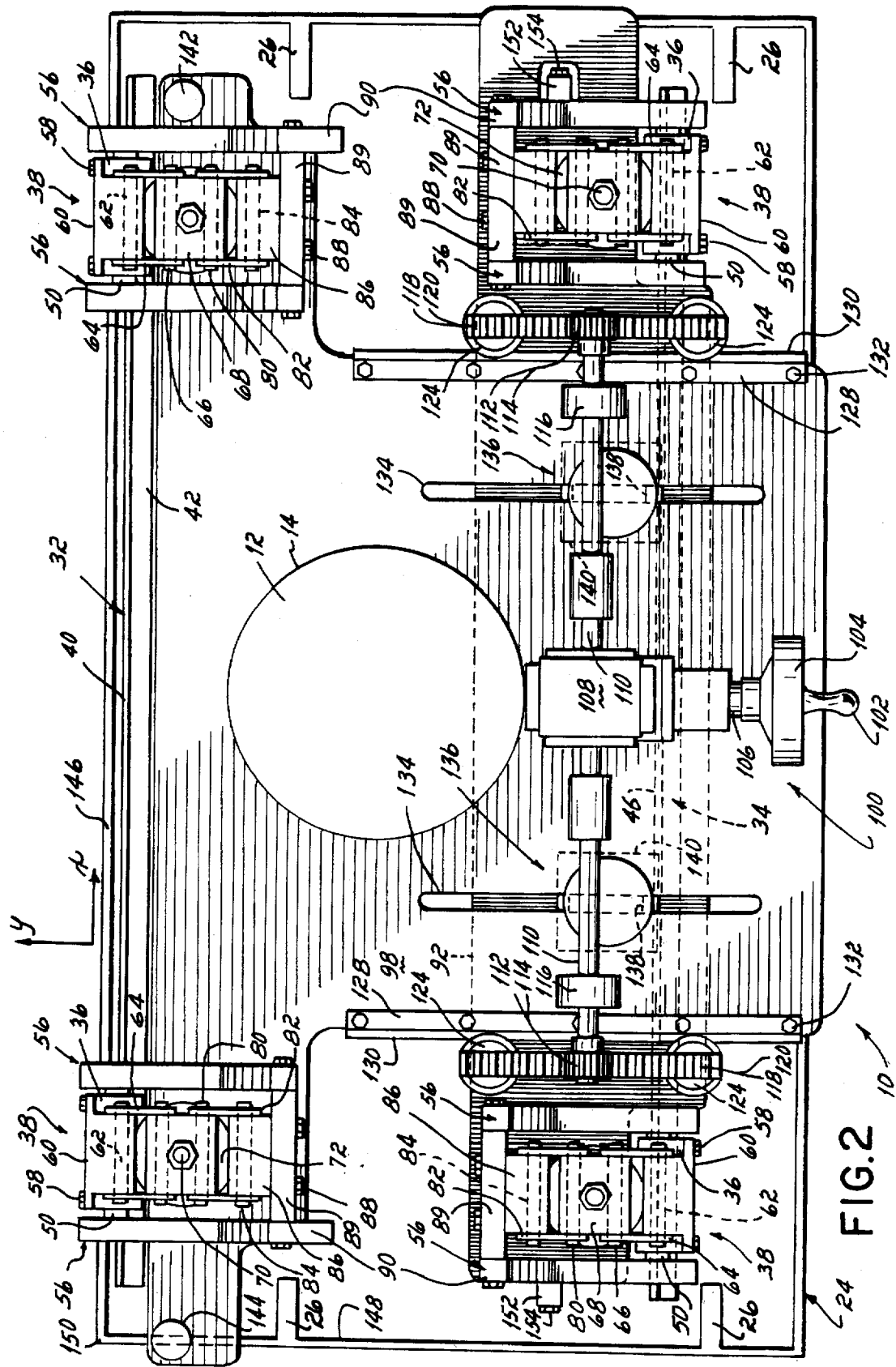
FIG. 2 is a plan view taken along line 2—2 of the end effector of FIG. 1.

As shown particularly in FIGS. 2 and 3, the gears 112 on each end of the shaft 110 of the translating mechanism 100 each engage a rack 118 having a plurality of spaced teeth 120 on the upper edge thereof which mesh with the teeth 114 on the gear 112. The rack 118 is secured to the moveable lower plate 92 by a pair of posts (not shown) that position it above fixed plates 98. Also secured to the lower plate 92 by a pair of posts 123 are rollers 124 mounted thereon for rotation. The outer circumferential edge of each roller 124 has a V-shaped notch or groove 126 which mates with a V-shaped edge 128 on a track or way 130 which is secured to the mounting plate 98 by bolts 132 or the like. The mating rollers 124 and ways 130 stabilize, align and guide the movement of the blocking abutment member 34, associated actuator assemblies 38 and lower plate 92. Rotation of the handwheel 104 rotates the shaft 106 which in turn drives the shaft 110 and the gears 112 on each end thereof. As the gears 112 rotate the meshing gear and rack teeth 114 and 120, the gears 112 translate the racks 118 which are secured to the moveable plate 92. As the moveable plate 92 translates the distance between the blocking and lifting abutment members 34, 32, respectively, is adjusted to accommodate variously sized blanks 16. The V-shaped way 130 stabilizes and aligns the position of the moving plate 92 as the rollers 124 translate therealong in response to the movement of the moveable blocking abutment member 34.

A pair of slots 134 are provided in the mounting plate 98 as shown particularly in FIG. 2 and pneumatic or air cylinder clamps 136 are positioned above the mounting plate slots 134 with a stem 138 of each clamp 136 projecting through the slot 134 into a clamping plate 140 which is affixed to the moveable lower plate 92. Once the position of the blocking abutment member 34 is adjusted by the translating mechanism 100 as described, each clamp 136 is engaged to retract the stem 138 upwardly and press the clamping plate 140 on to the lower surface of the mounting plate 98. As a result, the position of the moveable plate 98 and blocking abutment member 34 is releasably fixed relative to the mounting plate 92 and lifting abutment member 32.

Sensors 142, 144 are provided on outwardly extending portions of the mounting plate 98 proximate the actuator assemblies 38 as shown particularly in FIGS. 1 and 2. The sensors 142, 144 determine the position of the tote 24 in order to accurately position the end effector 10 relative to the tote 24 and the tray 22 of blanks 16 therein. The sensors 142, 144 cooperate to determine the position of an end wall 146 of the tote. The tote 24 is stationary and the robot 12 moves the end effector 10 and sensors 142, 144 in the direction of the Y-axis as indicated in FIG. 2 until both sensors 142, 144 pass over and detect the end wall 146. Preferably, the sensors 142, 144 will pass about two inches on each side of the end wall 146 along the Y-axis to accurately determine two reference points, one for each sensor, of the tote 24 along the X-axis. This information is passed to a controller (not shown) of the robot 12. Once the first two reference points along the X-axis are determined, the robot 12 then moves the end effector 10 perpendicularly along the X-axis so that sensor 144 can detect a side wall 148 of the tote 24. The end effector 10 preferably travels about four inches along the X-axis passing over and beyond the side wall 148 until it is detected. The sensor 144 is a dual function sensor in that it provides a reference point along the X-axis as previously described and along the Y-axis as presently described. The sensor 144 thusly detects a third reference position of the tote 24 to establish the position of the side wall 148 along the Y-axis. This information is also passed to the controller which uses the three reference points to determine a corner 150 of the tote 24 by calculating the intersection of a line passing through the third reference point which is perpendicular to a line defined by the first two reference points. Once the position of the tote 24 is established, the robot 12 lowers the abutment members 32, 34 into the tote 24 between the end walls 146 thereof and the edges 20 of the stack 18 of blanks 16. The spacing into which the abutment members 32, 34 project is maintained by the fixed position of the tray 22 within the tote 24. Once the position of the side wall 148 and the end wall 146 is determined the corner 150 of the tote 24 is also determined and the robot 12 moves the end effector 10 in position for the lifting operation of the blanks 16 from the tray 22.

As shown in FIGS. 1, 2 and 4, retaining arms 152 are mounted as by bolts 154 or other fasteners to the outermost L-shaped brackets 56 on each end of the moveable plate 92. The retaining arms 152 are generally rectangular with a tapered lower end 156 and project downwardly from the moveable plate 92. When the end effector 10 is lowered into position on the stack 18, the retaining arms 152 are spaced slightly from each end face 158 of the stack 18. After the abutment members 32, 34 close and capture the stack 18 and lift it from the tray 22, the retaining arms 152 inhibit the flexible blanks 16 from bowing outwardly and thereby changing the dimension between the opposed edges 20 of the blanks 16. The outer dimension of retaining arms 152 is less than about one inch so that the spacer 26 in the tote 24 maintains a sufficient gap between the faces 158 of the outermost blanks and the tote side walls 148 to avoid interference as the arms 152 are lowered into the tote 24.

The components of presently preferred embodiments of the end effector 10 according to this invention having been discussed and the operation of the end effector 10 in lifting and transferring the stack 18 of carton blanks 16 will now be described. Depending upon the dimensions of the blanks 16 and stack 18 formed thereof, the position of the moveable blocking abutment members 34 is adjusted by rotation of the handwheel 104 which through the couplings and gear box 108 rotates the gears 112 and translates the rack 118 and moveable plate 92 connected thereto along with the blocking abutment members 34. The distance between the blocking abutment member 34 and the lifting abutment member 32 is thusly adjusted to be preferably about two inches greater than the width the blanks 16 so that when the abutment members 32, 34 are lowered by the robot 12 into the tote 24, they do not contact or interfere with the blanks 16 or the tote 24.

The robot 12 lowers the end effector 10 with the abutment members 32, 34 in the open position as shown in dashed lines in FIG. 4. The flange 42 on the lifting abutment member 32 proximate the tabs 30 on the blanks 16 must be lowered to a position below the tabs 30 as shown in FIG. 4 in one presently preferred embodiment. The blocking abutment member 34 is preferably positioned at level horizontally above that of the tabs 30.

Once the abutment members 32, 34 are thusly positioned, the actuating cylinders 72 project the studs 70 downwardly thereby pivoting the first link 64 in the direction of Arrows C so that the flag bracket 60 and arms 36 secured thereto pivot the abutment member 32, 34 into the closed position engaging the edges 20 of the blanks 16. The support 75 at the lower end of each actuating cylinder 72 is pivotally connected between the upwardly projecting arms of the clevis bracket 78 to accommodate for any non-vertical movement of the stud 70 during the pivoting of the abutment members 32, 34 into engagement with the edges 20 of the blanks 16. The studs 70 are extended upwardly by the actuating cylinders 72 to release the blanks 16 at the appropriate time.

The abutment members 32, 34 are engaged with the opposing edges 20 of the blanks 16 are positioned with the flange 42 in contact with the lower portion of the tab 30 as shown in FIG. 4 and the blocking abutment member 34 into engagement with the opposing edge 20 of blanks 16 proximate the upper end thereof. With the abutment members 32, 34 thusly engaged with the blanks 16, the end effector 10 is pulled upwardly by the robot 12 to thereby remove the blanks 16 from the tray 22 as shown in FIG. 5. The approximate center of gravity of the stack 18 is indicated by the legend 160 in FIG. 5 which in combination with the upward force F of the flange 42 on the tabs 30 tends to pivot the blanks 16 in the direction of Arrow D so that the stack 18 is urged toward the blocking abutment member 34 as shown by Arrow E. However, the blocking abutment member 34 negates the moment arm created between the center of gravity 160 and the tab 30. It will be appreciated that the weight of the blank 16 will tend to be exerted in a downward direction; however, the downward movement of the blank 16 is obstructed by the flange 42 which engages the tab 30. Thus, the abutment members 32, 34 cooperate to lift the stack of blanks 16 upwardly by only engaging the opposing edges 20 of the blanks 16. The operation of the end effector 10 as described has been successfully tested for a stack of 500 blanks in a single lifting operation. Further, there are few limitations on the width of the blanks 16 since each blank is supported directly by its own tab 30. Likewise, the forces applied to the carton blanks 16 are minimal thereby reducing the potential for damage thereof.

It will be appreciated that maintaining approximately the original width of the blanks 16 once engaged by the abutment members 32, 34 is important to the successful operation of the end effector 10 according to this invention. Since the individual blanks 16 may be flexible, they may have the tendency to bow outwardly when the abutment members 32, 34 are closed. However, the tendency for the blanks 16 to bow is prevented for a number of reasons. Specifically, the retaining arms 152 positioned on opposing faces 158 of the block 18 prevent the blanks 16 from bowing outwardly sufficiently to fall from the end effector 10. Slight bowing may result once the stack 18 is initially lifted from the tray 22 but this is minimized by the retaining arms 152 and in operation of the invention has proven to be inconsequential. In addition, although the blanks 16 may be individually flexible, when a plurality of flexible blanks 16 are assembled together to form the block 18, they cooperate sympathetically with one another to form a more rigid and inflexible unit thereby preventing the blanks 16 from significantly bowing outwardly when engaged by the opposing abutment members. Furthermore, the blanks 16 themselves in certain operations may be of relatively rigid material and thereby comparatively inflexible. As a result, the block 18 of relatively rigid blanks is also inflexible and thereby will not bow when being lifted by the end effector 10.

Alternative devices for the abutment members are envisioned according to this invention. In particular, as shown in FIG. 4A a friction pad 164 is mounted to the face of the abutment plate 46. The friction pad 164 preferably is a slightly compressible material with a high coefficient of friction. The pad 164 is used to support the blanks 16 from one or both edges 20 of the block 18 and engages the edges 20 with a sufficient force to overcome the weight of the blanks 16 during the lifting operation.

Another alternative abutment member device is shown in FIG. 4B which includes a knife edge 162 or plural knife edges (not shown) on the abutment member 32 or 34 to engage the edges 20 of the blanks 16. Preferably, the knife edge 162 is sufficiently sharp so that when pressed into the edges 20 it provides an appropriate gripping mechanism for the blanks 16. Further, the blanks 16 may include features such as the tabs 30 or the like for improved gripping. The knife edge impressions in the blank edges 20 will be minimally discernable particularly if located in non-obvious or unexposed areas once the carton is erected.

It will be appreciated by one of ordinary skill in the art that the various abutment members shown and described herein can be used individually or in combination to engage the opposing edges 20 of the blanks 16. Further, the abutment members shown and described herein or other embodiments may be used with or without the specific features of the blanks 16 such as the tabs 30 for the lifting of the stack 18 by the end effector 10. Alternatively, specific features such as notches, tabs or the like may be added to the blanks 16 if not already provided for the purpose of offering a means to better facilitate lifting or handling of the stack 18 of blanks 16 with the end effector 10 according to this invention.

Accordingly, the end effector of this invention operates to pick up a stack or log of flexible or inflexible blanks by engaging the opposing edges of the blanks and thereby lifting them upwardly from the tote or carton for transfer to a subsequent station. The lifting operation of the end effector is accomplished without the complicated procedures or hardware required of the prior art which may include inverting the stack of blanks and then lifting the tray from the stack while supporting the bottom of the stack with bombay type doors or gates. With the end effector of this invention, the stack is only contacted by the abutment members on the opposing edges and the bottom of the stack remains unsupported for easy manipulation and transfer to a subsequent station or machine.

From the above disclosures of the general principles of the present invention and the preceding detailed description of preferred embodiments, those skilled in the art will readily comprehend the various modifications to which this invention is susceptible. Therefore, I desire to be limited only by the scope of the following claims and equivalents thereof.

We claim:

1. A combination comprising:
   a stack of generally planar and vertically oriental blanks wherein a face of each said blank is juxtaposed to a face of an adjacent blank with opposing edges of said blanks being generally aligned and combining to form opposing sides of said stack; and
   a lifting apparatus comprising:
   a pair of movable arms;
   an abutment member connected to each said arm, each said abutment member engaging one of the sides of the stack; and
   a carriage to selectively move said arms and said abutment members connected thereto into and out of engagement with the sides of the stack and to lift said abutment members with the stack therebetween.

2. The combination of claim 1 wherein the blanks are individually flexible and the lifting apparatus further comprises:
   a pair of retainers to inhibit the flexible blanks from deflecting when said abutment members engage the stack, each said retainer engaging one face of a pair of opposed faces of the stack, said pair of faces being adjacent to the sides of the stack.

3. The combination of claim 1 further comprising:
   a translating mechanism on the lifting apparatus for adjusting a distance between said pair of abutment members to accommodate stacks of varying dimensions.

4. An apparatus for lifting a stack of generally planar blanks wherein a face of each said blank is juxtaposed to a face of an adjacent blank with opposing edges of said blanks being generally aligned and combining to form opposing sides of said stack, said apparatus comprising:
   a pair of movable arms;
   an abutment member connected to each said arm, each said abutment member being capable of engaging one of the sides of the stack; and
   a carriage to selectively move said arms and said abutment members connected thereto into and out of engagement with the sides of the stack and to lift said abutment members with the stack therebetween;
   wherein one of said abutment members engages a lower portion of a plurality of tabs on the edges of the blanks on one of the sides of the block and said other abutment member engages an upper portion of the other of the sides to prevent said block from rotating from between said abutment members when engaged therewith in response to a moment arm created between a center of gravity of the stack and said tabs.

5. The apparatus of claim 4 wherein said abutment members are selected from the following devices: a knife edge, a planar plate, a friction pad and a flange.

6. A combination comprising:
   a stack of generally planar and vertically oriented blanks wherein a face of each said blank is juxtaposed to a face of an adjacent blank with opposing edges of said blanks being generally aligned and combining to form opposing sides of said stack; and
   an end effector comprising:
   a first arm and a second arm;
   a first abutment member and a second abutment member connected to said first and second arms, respectively, said first and second abutment members engaging opposed first edges and second edges, respectively, of the blanks; and
   an actuator connected to each said first and second arm, said actuator selectively moving said abutment members into and out of engagement with said respective edges of the blanks, whereby when said abutment members are engaged with said respective edges the robot can lift said abutment members and the stack captured therebetween to transfer the stack to another station.

7. The combination of claim 6 wherein the blanks are individually flexible, the end effector further comprises:

a pair of retainers to inhibit the flexible blanks from deflecting when said abutment members engage the stack, each said retainer engaging one face of a pair of opposed faces of the stack, said pair of faces being adjacent to the edges of the stack.

8. The combination of claim 6 further comprising:

a translating mechanism on the end effector for adjusting a distance between said pair of abutment members to accommodate stacks of varying dimensions.

9. An end effector mounted on a robot for handling a stack of generally planar blanks wherein a face of each said blank is juxtaposed to a face of an adjacent blank with opposing edges of said blanks being generally aligned and combining to form opposing sides of said stack, said end effector comprising:

a first arm and a second arm;

a first abutment member and a second abutment member connected to said first and second arms, respectively, said first and second abutment members being capable of engaging opposed first edges and second edges, respectively, of the blanks;

an actuator connected to each said first and second arm, said actuator selectively moving said abutment members into and out of engagement with said respective edges of the blanks, whereby when said abutment members are engaged with said respective edges the robot can lift said abutment members and the stack captured therebetween to transfer the stack to a station;

a translating mechanism for adjusting a distance between said pair of abutment members to accommodate stacks of varying dimensions;

a plate on which said actuator for said first arm is mounted, said plate being movable with respect to the robot and said second arm actuator;

a drive mechanism to move said plate and said first arm actuator so that said first abutment member is positioned relative said first edge of the stack; and a clamp for securing said plate and said first arm actuator in a set position relative to the stack.

10. An end effector mounted on a robot for handling a stack of generally planar blanks wherein a face of each said blank is juxtaposed to a face of an adjacent blank with opposing edges of said blanks being generally aligned and combining to form opposing sides of said stack, said end effector comprising;

a first arm and a second arm;

a first abutment member and a second abutment member connected to said first and second arms, respectively, said first and second abutment members being capable of engaging opposed first edges and second edges, respectively, of the blanks; and an actuator connected to each said first and second arm, said actuator selectively moving said abutment members into and out of engagement with said respective edges of the blanks, whereby when said abutment members are engaged with said respective edges the robot can lift said abutment members and the stack captured therebetween to transfer the stack to another station;

wherein said abutment member on said first arm engages a lower portion of a plurality of tabs on said first edge of each of the blanks and said second abutment member engages an upper portion of said second edge to prevent said block from rotating from between said abutment members when engaged therewith in response to a moment arm created between a center of gravity of the stack and said first abutment member engaged with said tabs.

11. The end effector of claim 10 wherein said abutment members are selected from the following devices: a knife edge, a planar plate, a friction pad and a flange.

12. An end effector mounted on a robot for handling a stack of generally planar blanks wherein a face of each said blank is juxtaposed to a face of an adjacent blank with opposing edges of said blanks being generally aligned and combining to form opposing sides of said stack, said end effector comprising:

a first arm and a second arm;

first abutment member and a second abutment member connected to said first and second arms, respectively, said first and second abutment members being capable of engaging opposed first edges and second edges, respectively, of the blanks; and an actuator connected to each said first and second arm, said actuator selectively moving said abutment members into and out of engagement with said respective edges of the blanks, whereby when said abutment members are engaged with said respective edges the robot can lift said abutment members and the stack captured therebetween to transfer the stack to another station;

wherein the stack is contained in a tote and the end effector further comprises:

at least one sensor to detect a reference position on said tote; and an assembly to position the end effector with respect to said reference position and the stack within said tote so that said abutment members are in position to engage said respective side edges.

13. The end effector of claim 12 further comprising a pair of said first arms and a pair of said second arms each connected to said first and second abutment members, respectively.

14. An end effector mounted on a robot for handling a stack of generally planar blanks wherein a face of each said blank is juxtaposed to a face of an adjacent blank with opposing edges of said blanks being generally aligned and combining to form opposing sides of said stack, said end effector comprising:

a first arm and a second arm;

a first abutment member and a second abutment member connected to said first and second arms, respectively, said first and second abutment members being capable of engaging opposed first edges and second edges, respectively, of the blanks;

an actuator connected to each said first and second arm, said actuator selectively moving said abutment members into and out of engagement with said respective edges of the blanks, whereby when said abutment members are engaged with said respective edges the robot can lift said abutment members and the stack captured therebetween to transfer the stack to another station;

wherein said actuator for each said arm comprises:

a movable post;

a collar fixed to said post; and a link pivotally coupled at a first end to said collar and at a second end to a bracket which is connected to said arm;

wherein said bracket is pivotally coupled to said actuator so that when said actuator moves said post selectively downwardly and upwardly said link pivots said bracket so that said abutment member engages and disengages, respectively, the stack.

15. An end effector mounted on a robot for handling a stack of flexible, generally planar blanks wherein a face of each said blank is juxtaposed to a face of an adjacent blank with opposing edges of said blanks being generally aligned and combining to form opposing sides of said stack, said stack being contained within a tote, said end effector comprising:

a first arm and a second arm;

a first abutment member and a second abutment member connected to said first and second arms, respectively, said first and second abutment members being capable of engaging opposed first side edges and second side edges, respectively, of the blanks;

an actuator connected to each said first and second arm, said actuator selectively moving said abutment members into and out of engagement with said respective edges of the blanks, whereby when said abutment members are engaged with said respective edges the robot can lift said arms, abutment members and the stack to transfer the stack to another station;

wherein each said actuator further comprises:
(a) a movable post;
(b) a collar fixed to said post;
(c) a link pivotally coupled at a first end to said collar and at a second end to a bracket which is connected to said arm, wherein said bracket is pivotally coupled to said actuator so that when said actuator moves said post selectively downwardly and upwardly said link pivots said bracket so that said abutment member engages and disengages, respectively, the stack;

a pair of retainers to inhibit the flexible blanks from deflecting when said abutment members engage the stack, each said retainer engaging one face of a pair of opposed faces of the stack, said pair of faces being adjacent to the sides of the stack;

a translating mechanism for adjusting a spacing between said pair of abutment members to accommodate stacks of varying dimensions, wherein said translating mechanism further comprises:
(a) a plate on which said actuator for said first arm is mounted, said plate being movable with respect to the robot and said second arm actuator;
(b) a drive mechanism to move said plate and said first arm actuator so that said first abutment member is positioned relative said first edge of the stack;
(c) a clamp for securing said plate and said first arm actuator in a set position relative to the stack;

at least one sensor to detect a reference position on said tote; and an assembly to position the end effector with respect to said reference position and the stack within said tote so that said abutment members are in position to engage said respective side edges.

16. The end effector of claim 15 where said abutment member on said first arm engages a lower portion of a plurality of tabs on each of the edges of the blanks on said first edge and said second abutment member engages an upper portion of said second edge to prevent said block from rotating from between said abutment members when engaged therewith in response to a moment arm created between a center of gravity of the stack and said first abutment member engaged with said tabs.

17. A method comprising the steps of:

providing a stack of generally vertically oriented blanks wherein a face of each said blank is juxtaposed to a face of an adjacent blank, said blanks have aligned and opposing first and second edges;

positioning the stack between first and second spaced abutment members of an end effector;

contacting the first and second opposite edges of the blanks with said first and second abutment members, respectively;

lifting the stack with said abutment members;

transferring the stack to a processing station for further processing; and releasing said abutment members from said respective edges of the blanks.

18. The method of claim 17 wherein said contacting is limited to contact only by said abutment members on said respective edges in order to lift and transfer the stack.

19. The method of claim 17 comprising:

adjusting the spacing between said abutment members according to the size of the stack of blanks prior to contacting the stack with said abutment members.

20. The method of claim 17 wherein the blanks are individually flexible, the method further comprising:

inhibiting the individually flexible blanks from deflecting after the stack is contacted by said abutment members in order to prevent the stack from falling after being lifted.

21. The method of claim 18 wherein a bottom of the stack is unsupported during said lifting.

22. The method of claim 17 further comprising:

depositing the stack of blanks into a tote for further handling and processing.

23. A method of transferring a stack of blanks contained in a tote to a station for processing wherein said blanks have aligned and opposing first and second edges, the method comprising the steps of:

positioning the stack between first and second spaced abutment members of an end effector;

contacting the first and second opposite edges of the blanks with said first and second abutment members, respectively;

lifting the stack with said abutment members out of said tote;

transferring the stack to the station for further processing;

releasing said abutment members from said respective edges of the blanks; and detecting a corner of the tote as a reference in order to accurately position said abutment members with the stack therebetween prior to said contacting.

24. A method of transferring a stack of blanks contained in a tote to a station for processing wherein said blanks have aligned and opposing first and second edges, the method comprising the steps of:

positioning the stack between first and second spaced abutment members of an end effector;

contacting the first and second opposite edges of the blanks with said first and second abutment members, respectively;

lifting the stack with said abutment members out of said tote;

transferring the stack to the station for further processing; and releasing said abutment members from said respective edges of the blanks;

wherein said contacting further comprises:
    positioning said first abutment member below a tab on each of the blanks on said first edge;
    positioning said second abutment member horizontally above said first abutment member proximate said second edge; and
    engaging said first and second edges with said first and second abutment members, respectively, so that when the stack is lifted said second abutment member inhibits the stack from pivoting from between said abutment members as a result of a moment arm created between a center of gravity of the stack and said first abutment member.

25. A method of transferring a stack of individually flexible blanks contained in a tote to station for processing wherein said blanks have aligned and opposing first and second edges, the method comprising the steps of:
    adjusting a spacing between first and second abutment members of an end effector according to the size of the stack of blanks;
    detecting a corner of the tote as a reference;
    positioning the stack between said first and second spaced abutment members with reference to said corner of the tote;
    contacting the first and second opposite edges of the blanks with said first and second abutment members, respectively;
    lifting the stack with said abutment members out of said tote;
    inhibiting the individually flexible blanks from deflecting after the stack is contacted by said abutment members in order to prevent the stack from falling after being lifted;
    transferring the stack to the station for further processing; and
    releasing said abutment members from said respective edges of the blanks.

26. The method of claim 25 wherein said contacting further comprises:
    positioning said first abutment member below a tab on each of the blanks on said first edge;
    positioning said second abutment member horizontally above said first abutment member proximate said second edge; and
    engaging said first and second edges with said first and second abutment members, respectively, so that when the stack is lifted said second abutment member inhibits the stack from pivoting from between said abutment members as a result of a moment arm created between a center of gravity of the stack and said first abutment member.

27. The method of claim 25 wherein a bottom of the stack is unsupported during said lifting.

28. The method of claim 25 wherein said contacting is limited to contact only by said abutment members on said respective edges in order to lift and transfer the stack.

* * * * *